(12) United States Patent
Carroll

(10) Patent No.: US 6,363,964 B1
(45) Date of Patent: Apr. 2, 2002

(54) ADJUSTABLE PRESSURE REGULATOR

(76) Inventor: Kent Carroll, 8 Wagon Wheel Ct., Bolingbrook, IL (US) 60490

( * ) Notice: Subject to any disclaimer, the term of this patent is extended or adjusted under 35 U.S.C. 154(b) by 0 days.

(21) Appl. No.: 09/650,495

(22) Filed: Aug. 29, 2000

(51) Int. Cl.[7] .............................................. G05D 16/10
(52) U.S. Cl. ................................................. 137/505.41
(58) Field of Search ....................... 137/505.41, 505.39

(56) References Cited

U.S. PATENT DOCUMENTS

| | | | |
|---|---|---|---|
| 473,069 A | * 4/1892 | Giessenbier ........... | 137/505.41 |
| 2,615,287 A | 10/1952 | Senesky | |
| 2,918,081 A | 12/1959 | Lauer, Jr. | |
| 3,474,822 A | * 10/1969 | Kuhn et al. ............. | 137/505.41 |
| 3,848,631 A | 11/1974 | Fallon | |
| 3,890,999 A | 6/1975 | Moskow | |
| 3,926,208 A | 12/1975 | Hoffman et al. | |
| 4,064,890 A | 12/1977 | Collins et al. | |
| 4,181,139 A | 1/1980 | Martini | |
| 4,194,522 A | 3/1980 | Lucas et al. | |
| 4,226,257 A | 10/1980 | Trinkwalder | |
| 4,305,423 A | * 12/1981 | Adler ..................... | 137/505.13 |
| 4,450,858 A | 5/1984 | Acomb | |
| 5,086,807 A | 2/1992 | Lasnier et al. | |
| 5,123,442 A | 6/1992 | Geuy et al. | |
| 5,234,026 A | 8/1993 | Patterson | |
| 5,280,778 A | 1/1994 | Kotsiopoulos | |
| 5,368,022 A | 11/1994 | Wagner | |
| 5,392,825 A | 2/1995 | Mims et al. | |
| 5,411,053 A | 5/1995 | Markham et al. | |
| 5,522,421 A | 6/1996 | Holt et al. | |

* cited by examiner

Primary Examiner—Stephen M. Hepperle
(74) Attorney, Agent, or Firm—Welsh & Katz Ltd.

(57) ABSTRACT

An adjustable pressure regulator for controlling the delivery of a gas from a high pressure source to a low pressure device at a predetermined outlet pressure includes a body having an inlet port and an outlet port and defines a flow path therebetween. An insert is positioned in the body, in the flow path. A juncture of the insert with the body defines a first seal within the flow path. A piston is positioned in the insert for reciprocal movement therein. A pin assembly is adjustably mounted to the piston and extends through the insert. The pin assembly and insert define a variable pressure region therebetween. The pin assembly includes a sealing head portion positioned for cooperating engagement with the first seal. The pin assembly is reciprocal with the piston between a closed state wherein the sealing head region engages the first seal to isolate the inlet port from the outlet port and an opened stated wherein the sealing head region is disengaged from the first seal. A biasing element biases the piston and pin assembly into the opened state. When a pressure in the variable pressure region is higher than the predetermined outlet pressure, the piston and pin assembly reciprocate to the closed state and when the pressure in the variable pressure region is lower than the predetermined outlet pressure, the piston and pin assembly reciprocate to the opened state. The pin assembly is adjustable relative to the piston to vary the predetermined outlet pressure.

16 Claims, 3 Drawing Sheets

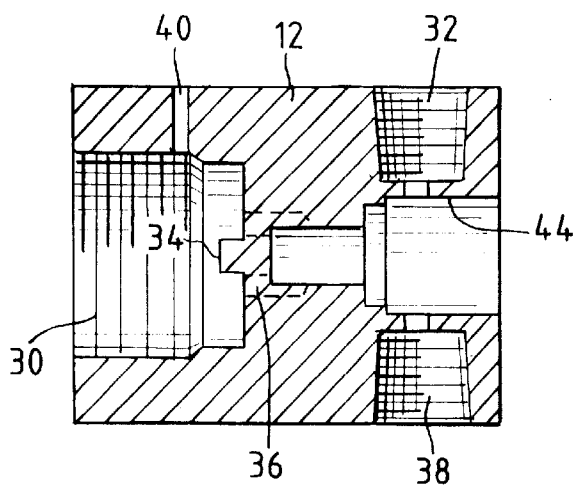
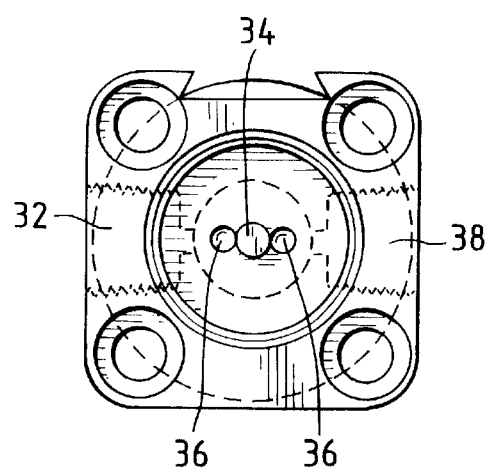
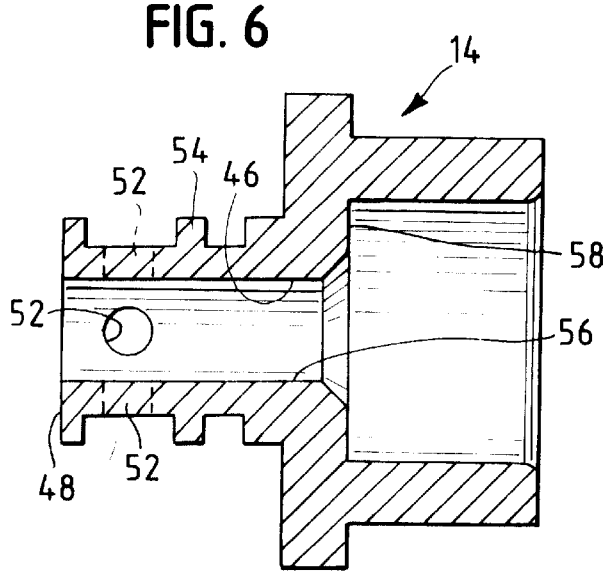
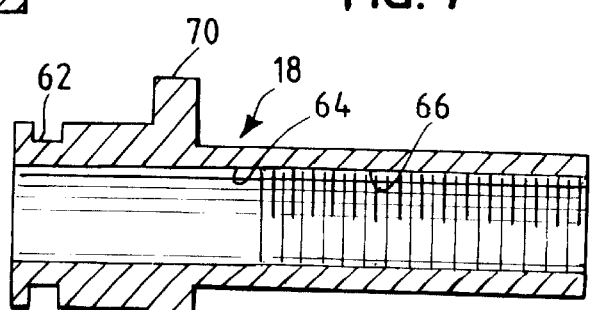
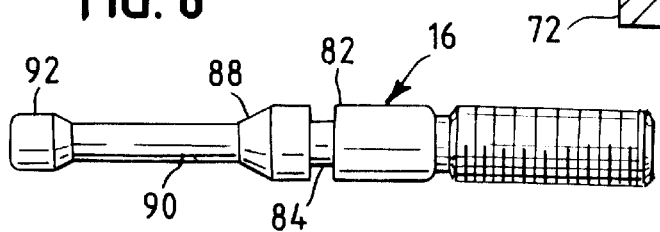

ADJUSTABLE PRESSURE REGULATOR

FIELD OF INVENTION

This invention relates to a pressure regulator. More particularly, the present invention relates to an adjustable pressure regulator for use in a gun that is used in sporting events where projectiles, such as paintballs, are propelled from the gun using compressed gas.

BACKGROUND OF THE INVENTION

Sporting events that simulate the strategies experienced in military confrontations have become quite popular. Typically, these sporting events require that the participants work as a group, or alone, with the goal to locate and capture other participants.

One such sporting event is commonly referred to as "paintball". In this event, participants fire projectiles at one another, which projectiles are liquid or paint-filled balls. In a typical paintball event, participants fire projectiles at one another and, when struck, are "painted" by the paint in the paintball. The object of such an event is to be the last person that has not been "painted" or hit with a projectile.

The projectiles used in these events are propelled, generally, using a compressed gas to avoid the potential dangers of explosives Such as gun powder.

Moreover, compressed gas is less costly than explosives and is readily obtainable.

When these types of systems are used, compressed gas is provided or supplied from a high-pressure source carried by the participant in a gas bottle. Although high-pressure gas is needed at the gun firing mechanism to propel the paintballs, typically the pressure in these bottles is greater than the pressure needed for propelling the projectile. As such, it is necessary to regulate the pressure of the compressed gas provided to the gun firing mechanism to prevent damage thereto. Typically, the regulator is mounted to the gun or the compressed gas bottle. That is, it is carried by the game participant.

Accordingly, there exists a need for a pressure regulator that can be adjusted to provide a downstream or outlet pressure within a narrow range, which regulator is easily adjusted. Desirably, such a regulator is sufficiently small and light-weight so that it does not increase, to any extent, the weight carried by a participant in a paintball sporting event.

SUMMARY OF THE INVENTION

An adjustable pressure regulator controls the delivery of a gas from a high pressure source to a low pressure device at a predetermined outlet pressure. The regulator includes a body having an inlet port and an outlet port and defining a chamber therebetween. The chamber defines a flow path for the gas from the high pressure source to the low pressure device.

The regulator is configured to deliver compressed gas at the outlet at a predetermined pressure, regardless of the inlet pressure.

An insert is positioned in the chamber and is fixedly disposed relative to the body. The chamber defines a first seal at a juncture with the body in the chamber. The first seal is disposed within the flow path.

A piston is positioned in the insert for reciprocal movement therein. The piston has a bore formed therein. A pin assembly is adjustably mounted to the piston and extends through the insert. The pin assembly and insert define a variable pressure region therebetween. The pin assembly includes a sealing head portion positioned for cooperating engagement with the first seal. The pin assembly is reciprocal fixedly with the piston between a closed state wherein the sealing head region engages the first seal to isolate the inlet port from the outlet port and an opened stated wherein the sealing head region is disengaged from the first seal to permit flow communication from the inlet port to the outlet port.

A biasing element is disposed for cooperating engagement with the piston to bias the piston and pin assembly into the opened state. When a pressure in the variable pressure region is higher than the predetermined or preset outlet pressure, the piston and pin assembly reciprocate to the closed state. Conversely, when the pressure in the variable pressure region is lower than the predetermined outlet pressure, the piston and pin assembly reciprocate to the opened state.

The pin assembly is adjustable relative to the piston to vary the predetermined outlet pressure. Preferably, the pin is threadedly engaged with the piston bore for adjustment relative to the piston.

In a current embodiment, a second seal is carried by the piston and is disposed between the piston and the insert, and a third seal is carried by the pin assembly and is disposed between the pin assembly and the piston. These seals prevent the escape of gas from between and around the various components.

Preferably, the pin assembly includes a back pressure region that is disposed in spaced relation to the sealing head region and a connecting portion between and separating the sealing head region and the back pressure region. The connecting portion has a diameter that is less than a diameter of the sealing head portion and less than a diameter of the back pressure region to facilitate the flow of compressed gas around the pin assembly. In a current embodiment, a transition between the sealing head region and the connecting portion is tapered and a transition between the connecting portion and the back pressure region is tapered.

The insert includes at least one and preferably a plurality of openings formed therein. The openings define a portion of the flow path to permit the flow of compressed gas through the insert and into the outlet port.

The regulator includes a bonnet mounted to the body. The bonnet and body enclose the insert, the piston, the pin assembly and the biasing element. In a preferred configuration, the bonnet includes an opening adapted to receive a portion of the piston, which portion is accessed for adjusting the pin relative to the piston.

These and other features and advantages of the present invention will be apparent from the following detailed description, the accompanying drawings, and the appended claims.

BRIEF DESCRIPTION OF THE FIGURES

FIG. 4 is a cross-sectional view of the body of the adjustable regulator;

FIG. 5 is an end view of the body of FIG. 4, which figure shows the opening,s formed in the body for receiving the regulator seal bolts;

FIG. 6 is a plan view of the regulator insert;

FIG. 7 is a plan view of the regulator piston; and

FIG. 8 is a plan view of the pin assembly of the regulator.

DETAILED DESCRIPTION OF THE PREFERRED EMBODIMENTS

Figure 1:
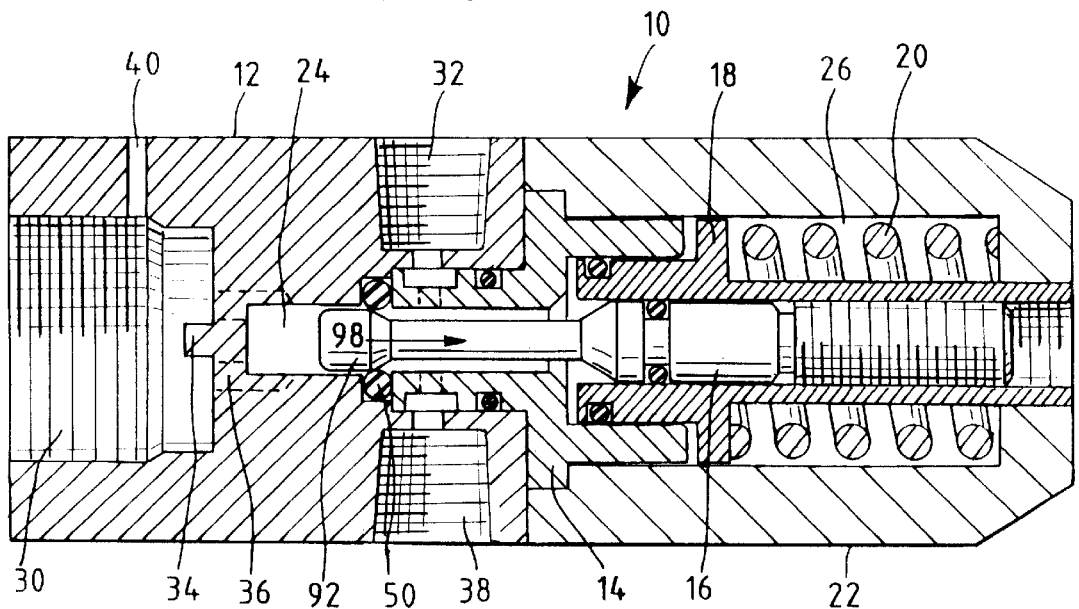
FIG. 1 is a partial cross-sectional view of an embodiment of the adjustable regulator in accordance with the principles of the present invention, the regulator being illustrated in the closed state or condition.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Figure 2:
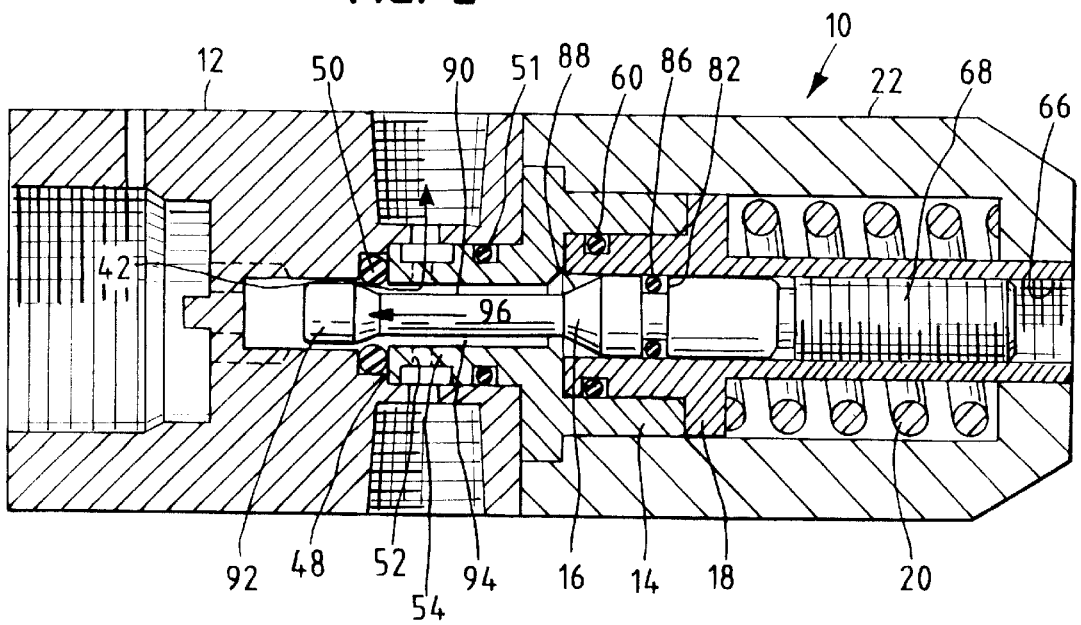
FIG. 2 is a partial cross-sectional view of the adjustable regulator of FIG. 1, with the regulator being illustrated in the open state or condition.
Figure 3:
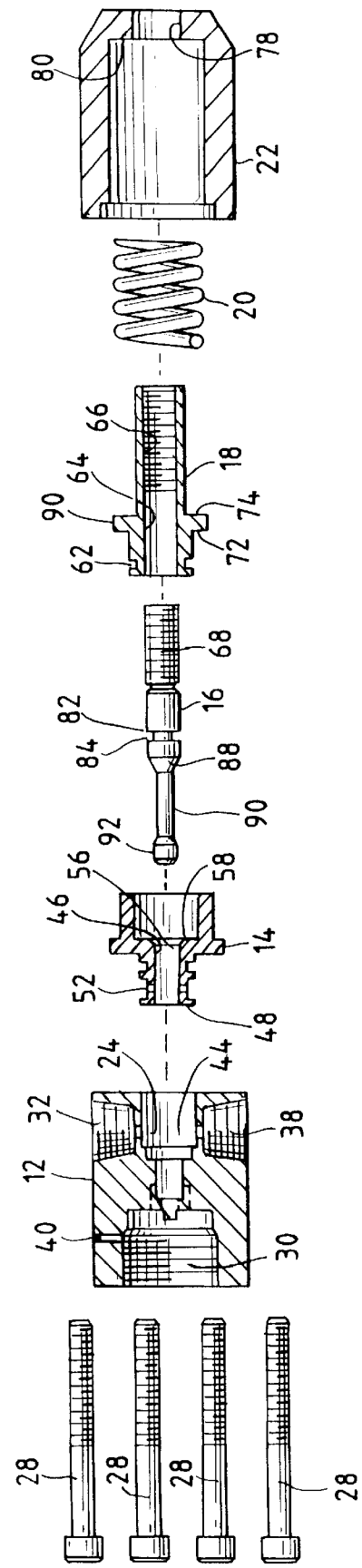
FIG. 3 is an exploded view of the adjustable regulator of FIGS. 1 and 2.

Referring now to the figures and in particular to FIGS. 1 and 2, there are shown cross-sectional views of an embodiment of adjustable pressure regulator 10 embodying the principles of the present invention. The regulator 10 includes, generally, a body 12, an insert 14, a pin assembly 16, a piston 18, a biasing element such as the exemplary coil spring 20, and a bonnet 22. The insert 14, pin assembly 16, piston 18 and spring 20 are disposed within cavities 24, 26 within the body 12 and bonnet 22 and are secured therebetween. The body 12 and bonnet 22 are secured to one another by, for example, mechanical fasteners, such as the exemplary regulator seal bolts 28.

The body 12 includes an inlet port 30 at which a high-pressure gas (from, for example, a compressed gas bottle (not shown)), is supplied to the gun (not shown). Pressurized gas flows from the inlet 30 and is supplied to the gun from an outlet port 32 formed in the body 12. The inlet port 30 can include a projection 34 for engaging a valve on the high pressure source (such as a pin valve) and a plurality of channels 36 for flow communication of the compressed gas from the port 30 to the interior of the regulator 10.

The body 12 can further include an additional port 38 at the outlet side to, for example, accommodate a pressure gauge (not shown) to monitor the regulator outlet pressure. A venting port 40 can be formed through the body 12 from the inlet port 30 to permit venting the regulator 10 to the environment when disconnecting the various components (e.g., gas bottle, gun and regulator 10) from one another.

FIG. 2. which shows the regulator 10 in the open state, illustrates a gas passage or flow path, indicated by the arrow at 42, defined in the body 12 from the inlet port 30 to the outlet port 32. The gas pressure is reduced within the passage 42, as will be described in detail below. The body 12 defines a chamber 44 in the gas passage 42 that is configured for receiving the insert 14.

The insert 14 includes a central bore 46 that is configured to receive the pin assembly 16. One end of the insert 14 is formed as a shoulder 48. A first seal 50, such as the exemplary O-ring, is disposed between the insert shoulder 48 and the regulator body 12 to form a seal therebetween. The first seal 50 isolates the gas passage 42 when the regulator 10 is in the closed position, as seen in FIG. 1. The seal 50, in addition to preventing flow from the high-pressure or inlet side of the regulator to the outlet (through the body), also forms a seal for the pin assembly 16. A second seal 51 is also positioned between the body 12 and the insert 14, outside of the gas flow path 42.

The insert 14 has a plurality of openings 52 formed in the walls 54 defining the central bore 46. These openings 52 define a portion of the gas passage 42 and permit the flow of compressed gas from the inlet to the outlet. The insert 14 includes a piston receiving opening 56 that is configured for receiving the piston 18. A stop surface 58 prevents over insertion of the piston 18 into the insert 14. A third seal 60, such as the exemplary O-ring, is disposed in a channel 62 formed in an outer surface of the piston 18 to provide a seal between the piston 18 and the insert 14. The third seal 60 thus prevents the flow of pressurized or compressed gas through the space between the piston 18 and the insert 14 and out into the environs.

The piston 18 further includes a central bore 64 therein that is configured for receiving the pin assembly 16. A portion of the piston 18 is configured having a threaded bore, as indicated at 66, for receiving a threaded portion 68 of the pin assembly 16, which threaded portions 66, 68 permit adjustment or movement of the pin assembly 16 relative to the piston 18. The piston 18 further includes a flange 70 having first and second or inner and outer stop surfaces 72, 74, respectively. The first or inner stop surface 72 is configured to abut the insert 14 when the regulator 10 is open (FIG. 2) to, with the insert shoulder 48, prevent over insertion of the piston 18 into the insert 14. The second or outer stop surface 74 is configured for engagement by the spring 20.

Referring to FIG. 1, it can be seen that the piston 18 resides within the bonnet 22 and the portion of the piston 18 having the threaded bore 66 extends through an opening 78 in the bonnet 22. The spring 20 is disposed between an inner surface 80 of the bonnet 22 and the piston flange outer surface 74 and is compressed therebetween.

The pin assembly 16 includes the threaded adjusting slug portion 68, a sealing region 82 having a channel 84 that is configured for carrying a seal, such as the exemplary O-ring or fourth seal 86, a tapered back pressure portion 88, an elongated connecting portion 90 and a tapered scaling head region 92. The connecting portion 90 extends between and separates the back pressure portion 88 and the sealing head region 92. The connecting portion 90 has a diameter that is smaller than the diameters of the back pressure region 88 and the sealing head region 92, to permit the flow of gas around the connecting portion 90. The adjusting slug portion 68 of the pin assembly 16 is threaded and configured to reside within the piston threaded bore 66. Thus, the pin assembly 16 is movable relative to the piston 18 by threadedly engaging or rotating the pin assembly 16 within the piston bore threads 66. To this end, the pin assembly 16 and piston 18 move with one another (i.e., as an integral unit) during normal operation of the regulator 10 and only move relative to one another when the regulator 10 is adjusted.

Referring to FIGS. 1 and 2, when assembled, the insert 14 extends into a portion of the body 12, in the body chamber 44. The first seal 50 is positioned between the insert 14 and the body 12. The pin assembly 16 is positioned in the insert 14 such that the sealing head 92 extends through the insert 14, past the first seal 50, and into the body 12. The piston 18 (which is mounted to the pin assembly 16 at the threaded portions 66,68) inserts into the insert 14. The second, third and fourth seals 51, 60 and 86 are positioned between the insert 14 and body 12, the piston 18 and insert 14 and the pin assembly 16 and the piston 18, respectively.

A space 94 is defined between the pin connecting portion 90 and the inner walls or surfaces 54 that define the insert bore 46. This space 94 is a variable pressure region, which is in open flow communication with the outlet port 32. The variable pressure region 94 is essentially bounded by the sealing head/first seal juncture (92/50), the pin assembly back pressure region/piston juncture (88/18 and the fourth seal 86) and the piston/insert juncture (18/14 and the third seal 60).

Operation of the regulator 10 and movement of the various parts relative to one another will now be described with reference to FIGS. 1 and 2, in which FIG. 1 illustrates the regulator 10 in the closed position and FIG. 2 illustrates the regulator 10 when it is open.

Referring to FIG. 2, when the regulator 10 is open, the force from the spring 20 that is exerted on the piston flange 70 urges the piston 18 inwardly of the regulator 10 (as indicated by the arrow at 96 showing the piston 18 moving to the left). As will be understood from a study of the figures, the pin assembly 16 moves with the piston 18. As the piston 18 and pin 16 move to the left, the sealing head 92 moves off of the first seal 50, thus opening the flow path or gas passage 42. This provides flow communication from the body inlet 30, around the sealing head 92 (and between the sealing head 92 and the first seal 50), and into the annular space between the pin connecting portion 90 and the insert 14, i.e., the variable pressure region 94. The gas then flows through the openings 52 formed in the insert 14 and out into the regulator outlet and the gauge ports 32, 38. As provided above, the third seal 60, that is the seal between the piston 18 and insert 14 and the fourth seal 86, that is the seal between the pin assembly back pressure portion 88 and the inner wall of the piston 18 prevent the escape of gas out of the regulator 10 between or around these components.

As gas flows into the outlet port 32, the pressure in the outlet port 32 increases as does the pressure within the variable pressure region 94. This increase in pressure overcomes the spring 20 force and, as such, pressure on the back pressure region 88 of the pin assembly 16 urges the piston 18 and pin assembly 16 to the right (as indicated by the arrow at 98) thus urging the regulator 10 into the closed condition.

When the outlet pressure is low, the pressure in the variable pressure region 94 is low and the spring 20 force acts to urge the pin 16 to the left, thus opening the regulator 10. As the outlet side pressure reaches the (adjusted) predetermined set point, the gas pressure urges the pin assembly 16 and piston 18 to the right, closing the regulator 10.

When in the closed condition, the pressure in the variable pressure region 94, as described above, overcomes the spring 20 force and maintains the piston 18 and pin assembly 16 urged to the right. When in this position, the sealing head 92 is held against the first seal 50 isolating the flow of compressed gas from the inlet 30 into the variable pressure region 94 and the outlet port 32.

The force exerted by the compressed gas on the sealing head 92, in conjunction with the pressure exerted on the back pressure region 88, maintains the regulator 10 closed (by urging the sealing head 92 against the first seal 50). When the pressure at the outlet port 32 begins to fall, pressure on the back pressure region 88, likewise begins to decrease and the spring 20 force overcomes the force exerted by the gas on the back pressure region 88. This, in turn, urges the pin assembly 16 and piston 18 to the left, opening the regulator 10.

Relative rotation of the pin assembly 16 (by rotating or adjusting the threaded portion of the pin 16, i.e., the adjusting slug 68) and the piston 18 permits adjustment of the pressure regulator 10 outlet pressure by increasing or decreasing compression of the spring 20. That is, because the position of the sealing head 92 is fixed when the regulator 10 is closed, by moving the piston 18 relative to the pin assembly 16 (during adjustment), the travel required for the piston 18 to close the regulator 10 can be varied. As will be recognized by those skilled in the art, this adjustment will thus increase and/or decrease the pressure required on the back pressure region 88 to move the pin assembly 16 and piston 18 into the closed condition.

For example, if the adjusting slug 68 is rotated so as to urge the pin 16 to the left, this will in turn require the gas pressure to urge the piston/pin assembly 18/16 further to the right against the action of the spring 20, thereby resulting in a higher delivered pressure.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. An adjustable pressure regulator for controlling the delivery of a gas from a high pressure source to a low pressure device at a predetermined outlet pressure, the adjustable pressure regulator comprising:

a body having an inlet port and an outlet port and defining a chamber therebetween, the chamber defining a flow path for the gas from the high pressure source to the low pressure device;

an insert positioned in the chamber and fixedly disposed relative to the body, the chamber defining a first seal at a juncture with the body in the chamber, the first seal disposed within the flow path;

a piston positioned in the insert for reciprocal movement therein, the piston having a bore formed therein;

a pin assembly adjustably mounted to the piston and extending through the insert, the pin assembly and insert defining a variable pressure region therebetween, the pin assembly including a sealing head portion positioned for cooperating engagement with the first seal, the pin assembly being reciprocal fixedly with the piston between a closed state wherein the sealing head region engages the first seal to isolate the inlet port from the outlet port and an opened stated wherein the sealing head region is disengaged from the first seal to permit flow communication from the inlet port to the outlet port;

a biasing element disposed for cooperating engagement with the piston to bias the piston and pin assembly into the opened state; and a third seal, the third seal carried by the pin assembly and disposed between the pin assembly and the piston, wherein when a pressure in the variable pressure region is higher than the predetermined outlet pressure, the piston and pin assembly reciprocate to the closed state and wherein when the pressure in the variable pressure region is lower than the predetermined outlet pressure, the piston and pin assembly reciprocate to the opened state, and wherein the pin assembly is adjustable relative to the piston to vary the predetermined outlet pressure.

2. The adjustable pressure regulator in accordance with claim 1 including a second seal, the second seal being carried by the piston and disposed between the piston and the insert.

3. The adjustable pressure regulator in accordance with claim 1 wherein the pin assembly includes a back pressure region disposed in spaced relation to the sealing head region and a connecting portion between the sealing head region and the back pressure region, the connecting portion having a diameter that is less than a diameter of the sealing head portion and less than a diameter of the back pressure region.

4. The adjustable pressure regulator in accordance with claim 1 wherein a transition between the sealing head region and the connecting portion is tapered.

5. The adjustable pressure regulator in accordance with claim 1 wherein a transition between the connecting portion and the back pressure region is tapered.

6. The adjustable pressure regulator in accordance with claim 1 wherein the insert includes at least one opening formed therein the opening defining a portion of the flow path.

7. The adjustable pressure regulator in accordance with claim 1 wherein the pin assembly is threadedly mounted to the piston for relative adjustable movement therebetween.

8. An adjustable pressure regulator for controlling the delivery of a gas from a high pressure source to a low pressure device at a predetermined outlet pressure, the adjustable pressure regulator comprising:
  a body having an inlet port and an outlet port and defining a chamber therebetween, the chamber defining a flow path for the gas from the high pressure source to the low pressure device;
  an insert positioned in the chamber and fixedly disposed relative to the body, the chamber defining a first seal at a juncture with the body in the chamber, the first seal disposed within the flow path;
  a piston positioned in the insert for reciprocal movement therein, the piston having a bore formed therein;
  a pin assembly adjustably mounted to the piston and extending through the insert, the pin assembly and insert defining a variable pressure region therebetween, the pin assembly including a sealing head portion positioned for cooperating engagement with the first seal, the pin assembly being reciprocal fixedly with the piston between a closed state wherein the sealing head region engages the first seal to isolate the inlet port from the outlet port and an opened stated wherein the sealing head region is disengaged from the first seal to permit flow communication from the inlet port to the outlet port;
  a biasing element disposed for cooperating engagement with the piston to bias the piston and pin assembly into the opened state;
  a bonnet mounted to the body, at least a portion of the insert, the piston, the pin assembly and the biasing element being carried by the bonnet, the bonnet including an opening adapted to receive a portion of the piston, the pin assembly being adjustable relative to the piston through the portion of the piston extending through the bonnet opening,
  wherein when a pressure in the variable pressure region is higher than the predetermined outlet pressure, the piston and pin assembly reciprocate to the closed state and wherein when the pressure in the variable pressure region is lower than the predetermined outlet pressure, the piston and pin assembly reciprocate to the opened state, and wherein the pin assembly is adjustable relative to the piston to vary the predetermined outlet pressure.

9. An adjustable pressure regulator for controlling the delivery of a gas from a high pressure source to a low pressure device at a predetermined outlet pressure, the adjustable pressure regulator comprising:
  a body having an inlet port and an outlet port and defining a flow path for the gas from the high pressure source to the low pressure device;
  an insert positioned in the flow path fixedly disposed relative to the body, a juncture of the insert with the body defining a first seal disposed within the flow path;
  a piston positioned in the insert for reciprocal movement therein;
  a pin assembly adjustably mounted to the piston and extending through the insert, the pin assembly and insert defining a variable pressure region therebetween, the pin assembly including a sealing head portion positioned for cooperating engagement with the first seal, the pin assembly being reciprocal fixedly with the piston between a closed state wherein the sealing head region engages the first seal to isolate the inlet port from the outlet port and an opened stated wherein the sealing head region is disengaged from the first seal to permit flow communication from the inlet port to the outlet port;
  a biasing element disposed for cooperating engagement with the piston to bias the piston and pin assembly into the opened state; and
  a bonnet mounted to the body, at least a portion of the insert, the piston, the pin assembly and the biasing element being carried by the bonnet, the bonnet including an opening adapted to receive a portion of the piston, the pin assembly being adjustable relative to the piston through the portion of the piston extending through the bonnet opening,
  wherein when a pressure in the variable pressure region is higher than the predetermined outlet pressure, the piston and pin assembly reciprocate to the closed state and wherein when the pressure in the variable pressure region is lower than the predetermined outlet pressure, the piston and pin assembly reciprocate to the opened state, and wherein the pin assembly is adjustable relative to the piston to vary the predetermined outlet pressure.

10. The adjustable pressure regulator in accordance with claim 9 including a second seal, the second seal being carried by the piston and disposed between the piston and the insert.

11. The adjustable pressure regulator in accordance with claim 9 including a third seal, the third seal carried by the pin assembly and disposed between the pin assembly and the piston.

12. The adjustable pressure regulator in accordance with claim 9 wherein the pin assembly includes a back pressure region disposed in spaced relation to the sealing head region and a connecting portion between the sealing head region and the back pressure region, the connecting portion having a diameter that is less than a diameter of the scaling head portion and less than a diameter of the back pressure region.

13. The adjustable pressure regulator in accordance with claim 9 wherein a transition between the sealing head region and the connecting portion is tapered.

14. The adjustable pressure regulator in accordance with claim 9 wherein a transition between the connecting portion and the back pressure region is tapered.

15. The adjustable pressure regulator in accordance with claim 9 wherein the insert includes at least one opening formed therein, the opening defining a portion of the flow path.

16. The adjustable pressure regulator in accordance with claim 9 wherein the pin assembly is threadedly mounted to the piston for relative adjustable movement therebetween.

\* \* \* \* \*